May 14, 1968 D. D. McRAE 3,383,655

CODE CONVERTERS

Filed Sept. 24, 1964 2 Sheets-Sheet 1

INVENTOR
DANIEL D. McRAE

BY Hurvitz & Rose

ATTORNEYS

CODE CONVERTERS

Filed Sept. 24, 1964

INVENTOR
DANIEL D. McRAE
BY Hurvitz & Rose
ATTORNEYS

United States Patent Office
3,383,655
Patented May 14, 1968

3,383,655
CODE CONVERTERS
Daniel D. McRae, Melbourne, Fla., assignor to Radiation Incorporated, Melbourne, Fla., a corporation of Florida
Filed Sept. 24, 1964, Ser. No. 398,946
16 Claims. (Cl. 340—146.1)

ABSTRACT OF THE DISCLOSURE

A code converter wherein data in analog or digital form is converted into an error-accentuating binary type code requiring no parity or redundant bits to provide the error accentuation function. The code is characterized by plural groups of bits, each group representing a discrete level of data. The groups are arranged in subdivisions of successive data levels, each group in a subdivision differing from all other groups in that subdivision in at least half of its bit location assignments.

CODE CONVERTERS

The present invention relates generally to error detection in information transmission systems and more particularly to digital code conversion for exaggerating errors occurring in the transmission of highly correlated digital data, so as to render such errors readily identifiable in the received information.

The capability of rapid error detection and/or correction is a pre-requisite to reliability in the communication of information. That is, it is generally of necessity that some means of identifying and correcting errors in transmitted data be associated with an overall information transmission system if the received or reconstructed data is to be substantially a replica of that data which has been transmitted. In this sense, the term "transmission" includes the temporary storage of information, as by memory techniques, for subsequent retrieval thereof, as well as the direct communication of information.

Exemplary of error detection and correction in the transmission of information is that occurring between persons communicating by way of oral conversation. In this case a "built-in" or automatic error detection system is maintained by virtue of the listener's knowledge or familiarity with the language spoken. Thus, if certain words or portions thereof are slurred by the speaker, or are otherwise indistinct, there is a high probability that, though unidentifiable if standing alone, the words will be recognized or understood by the listener because of the context, or linguistic environment, in which they are presented. The listener is able to interpret the indistinct word or portion thereof by retrieval of the correct word from his memory and from his knowledge of what the particular indistinct word should have been in the context presented. As previously stated, this detection and correction of errors in spoken language is of a substantially instinctive nature, ensuring with a high degree of probability that the intended word will be recognized and the error corrected.

A somewhat analogous situation is present in the communication of correlated data through a transmission medium, such as a wire or channel. When the transmitted information is highly correlated those errors in received data which occur during transmission may be detected through a statistical analysis or evaluation employing error probability distribution functions, as for example the Gaussian Probability density function. Such methods of statistical analysis are well known and need not be further discussed. It is sufficient to note that detection of errors may be based on the statistical possibility of dependence of variables in the transmitted data. That is, in the case of correlated data a mathematical relationship between data variables can be calculated to ascertain the probability of a second event (data word) occurring once a first event (another data word) has occurred. Such a relationship in probability of occurrence between subsequent variables is referred to as conditional probability, from which probability density and distribution functions may be determined for analytical purposes. Again, error recognition arises from a review of the "context" in which each piece of data appears.

An example of the transmission of relatively highly correlated digital data is the transmission of information by pulse code modulation (PCM) systems wherein the information carrying signal is sampled and quantized into a number of discrete levels. A relatively large number of such levels, for example 128 or more, may be required to maintain intelligibility, i.e. recognition of the original signal from the received data. The levels are coded prior to transmission in, for example, conventional binary 8–4–2–1 form or in the reflected binary or Gray code, whereby the pertinent data is transmitted in the form of groups of code elements. The code groups are decoded at the receiving point for eventual reconstruction of the original signal.

In many digital data transmission systems, as in PCM systems, the transmitted samples, suitably coded, are highly correlated such that the conditional probability distribution of the value of a particular data point is centered about the values of adjacent points. The standard deviation of this distribution will generally be relatively small compared to the full scale or range of values transmitted and received. When disturbances, for example in the form of noise or other perturbations, occur in the transmission channel, the data is altered and in some cases by a value which is in error by large fraction of full scale. In such cases the received error may be identified with relatively high probability as an error, rather than mistaken as data, because of the low probability that the data would have that value. More generally, however, the data alteration is not sufficiently great to be readily recognizable as an error, and detection of such errors is left to a statistical analysis in sifting the received data. It will be observed that the provision of some means of exaggerating errors occurring in the data transmission, to render them more easily detectable in the context or data environment in which they are received, would be extremely desirable. Such means should cause even small errors to deviate from the standard by a large percentage of full scale. Presently existing codes, such as the conventional binary code or variations thereof such as the reflected binary (Gray) code do not possess this property.

The Gray code, for example, is a binary conversion code which has the property or characteristic that successive levels of the code differ in only one binary element or component. That is, in the sequence of levels or code groups, each succeeding code group is arranged to differ from its adjacent code groups in only one digit or bit position. Such a code is of value in reducing coding errors by rendering the data error relatively less than the error in the device which caused it, and in reducing ambiguity at sector boundaries when the code is obtained from separate code wheel segments, tracks or the like.

On the other hand, the reflected binary code does not characteristically distinguish errors from transmitted data where the errors are caused by disturbances in the transmission channel. Rather, it has been customary to provide special error detecting arrangements, such as parity checks, in conjunction with the coded data.

In accordance with the present invention, data in analog or digital form is converted to a code having highly contrasting quantized levels, the code groups being arranged or assigned to respective levels such that groups differing in many digit positions or locations are placed in close proximity. More specifically, the code conversion process of the present invention produces subdivisions of code groups wherein each code group within a subdivision of assigned quantized levels differs from any other code group in that subdivision in at least half the digit positions or bit locations, a characteristic which may be designated as bi-orthogonality. Codes having this bi-orthogonal grouping are hereinafter termed contrast codes. It is known that single bit errors in a data word are much more probable than multiple bit errors at signal strengths which are normally of interest. The bi-orthogonal character of code groups relative to quantized or discrete levels endows the contrast code with the property that a change in a single bit location resulting from a disturbance in the transmission medium will effect a relatively large change in the quantized level in which that bit occurs in the received data. Thus, when errors occur in the data transmission, they are pronounced or exaggerated to render them easily identifiable whereby they may be readily corrected to provide the desired information in an efficient and reliable manner.

It is, accordingly, a broad object of the present invention to provide a contrast code for error detection in data transmission systems.

Another object of the present invention is to provide a method for reliable digial data transmission by conversion of analog or digital information to a contrast code which will permit rapid detection of errors occurring in the transmission.

A further object of the present invention is to provide apparatus for converting analog or digital signals to a contrast code.

Still further objects, features and attendant advantages of the present invention will become apparent from a consideration of the following detailed description of certain specific embodiments thereof, taken in conjunction with the accompanying drawings in which.

Figure 1:
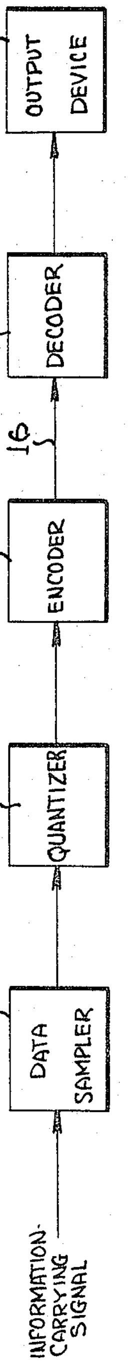
FIGURE 1 is a typical data transmission system employing contrast code converters in accordance with the present invention.

Contrast codes in accordance with the present invention may best be described by considering the formulation of a specific eight bit code group. In the conventional binary code, a sequence of code groups is assigned to quantized levels having decimal designations by appropriately weighting each element or component of a code group with a particular decimal number. For example, the code 0100 1001 is assigned to level or number 73, because a 1 appears in the element positions of the code group corresponding to weights of 64, 8, and 1, reading respectively from left to right. The sum of these weights is obviously equal to 73 in decimal form. As is well known, each bit 1 and 0 is representative of the particular state of the device or parameter from which it is obtained; such as an on or off condition, the presence or absence of a voltage, or the like.

In describing the relationship between contrast and conventional binary codes the states of the conventional 8 bit binary code will be designated $a_1, a_2, a_3 \ldots a_8$, where $a_1$ represents the state of the most significant bit, $a_2$ the next most significant bit, and so forth down to $a_8$, the least significant bit. Similarly, if the state of each bit position in the contrast code is designated $b_1, b_2, b_3 \ldots b_8$, the relationship between the basic 8 bit contrast code groups and the conventional binary code groups may be represented as follows:

$$b_1 = a_2 \oplus a_6 \oplus a_7 \oplus a_8 \quad (1)$$
$$b_2 = a_3 \oplus a_5 \oplus a_7 \oplus a_8 \quad (2)$$
$$b_3 = a_4 \oplus a_5 \oplus a_6 \oplus a_8 \quad (3)$$
$$b_4 = a_1 \oplus a_2 \oplus a_3 \oplus a_4 \oplus a_5 \oplus a_6 \oplus a_7 \quad (4)$$
$$b_5 = a_5 \quad (5)$$
$$b_6 = a_6 \quad (6)$$
$$b_7 = a_7 \quad (7)$$
$$b_8 = a_8 \quad (8)$$

In the above relationships, the symbol or notation $\oplus$ designates addition modulo-2. As an example of the code conversion process, the conventional binary code group having decimal number assignment 73, i.e. 0100 1001, will be converted to a contrast code group having a similar assignment. Performing the indicated addition modulo-2 operation, wherein even sums are "0" and odd sums are "1", $b_1=0$, $b_2=0$, $b_3=0$, $b_4=0$, $b_5=1$, $b_6=0$, $b_7=0$, $b_8=1$, thus formulating an eight bit contrast code group 0000 1001 which is assigned to level or number 73. The assignment generated by performing these indicated operations for a complete eight bit contrast code group class, that is a class containing 256 code groups, is illustrated in part by the following table.

*Table 1*

| Assignment: | Code |
|---|---|
| 0 | 0000 0000 |
| 1 | 1110 0001 |
| 2 | 1101 0010 |
| 3 | 0011 0011 |
| 4 | 1011 0100 |
| 5 | 0101 0101 |
| 6 | 0110 0110 |
| 7 | 1000 0111 |
| 8 | 0111 1000 |
| 9 | 1001 1001 |
| 10 | 1010 1010 |
| 11 | 0100 1011 |
| 12 | 1100 1100 |
| 13 | 0010 1101 |
| 14 | 0001 1110 |
| 15 | 1111 1111 |
| 16 | 0011 0000 |
| 17 | 1101 0001 |
| 18 | 1110 0010 |
| 19 | 0000 0011 |
| 20 | 1000 0100 |
| 21 | 0110 0101 |
| 22 | 0101 0110 |
| 23 | 1011 0111 |
| 24 | 0100 1000 |
| 25 | 1010 1001 |
| 26 | 1001 1010 |
| 27 | 0100 1011 |
| 28 | 1111 1100 |
| 29 | 0001 1101 |
| 30 | 0010 1110 |
| 31 | 1100 1111 |
| 32 | 0101 0000 |
| 33 | 1011 0001 |
| 34 | 1000 0010 |
| 35 | 0110 0011 |
| 36 | 1110 0100 |
| 37 | 0000 0101 |
| 38 | 0011 0110 |
| 39 | 1101 0111 |
| 40 | 0010 1000 |
| 41 | 1100 1001 |
| 42 | 1111 1010 |

*Table 1—Continued*

| Assignment: | Code |
|---|---|
| 43 | 0010 1011 |
| 44 | 1001 1100 |
| 45 | 0111 1101 |
| 46 | 0100 1110 |
| 47 | 1010 1111 |
| 48 | 0110 0000 |
| 49 | 1000 0001 |
| 50 | 1011 0010 |
| 51 | 0101 0011 |
| 52 | 1101 0100 |
| 53 | 0011 0101 |
| 54 | 0000 0110 |
| 55 | 1110 0111 |
| 56 | 0001 1000 |
| 57 | 1111 1001 |
| 58 | 1100 1010 |
| 59 | 0010 1011 |
| 60 | 1010 1100 |
| 61 | 0100 1101 |
| 62 | 0111 1110 |
| 63 | 1001 1111 |

It will be observed from these first 64 contrast code assignments that the 256 code groups in the eight bit contrast code are automatically broken down into 16 subdivisions of bi-orthogonal codes, delineated in the table for clarity, each subdivision therefore containing 16 code groups. Thus code assignments 0 to 15, 16 to 31, 32 to 47 and so forth are subdivisions of an eight bit classification in which the internal code groups thereof differ from each other in at least half the digit positions or bit locations. It is such a grouping of an overall classification into bi-orthogonal subdivisions which provides the contrast code with its desired property. Since any code formed by the interchange of columns, such as $b_1$ for $b_5$, has equally good properties, the code formed by any permutation of the code group elements in columns designated by the $b$ subscripts will produce, and are included in, the 8 bit contrast code class. It will, of course, be understood that the remaining 192 assignment levels, and code groups representative thereof, for the code class shown in Table 1 may be obtained by continuation of the conversion in accordance with relationships (1) to (8). Similarly, any permutation of code groups within a particular subdivision and/or any permutation of subdivisions also produces an 8 bit contrast code.

An examination of each subdivision of the 8 bit contrast code will indicate that each code group therein inherently differs from each of its neighbor code groups within the subdivision in at least half of the bit positions. Again using the code group assigned to number or level 73, assume that such a code group has been obtained, by a process to be described, and that it is being transmitted along with other code groups to provide desired information at a receiving point. Assume also that a disturbance occurs in the transmission channel, resulting in a change of the code group from 0000 1001 to 0100 1001. This corresponds to the element designated $b_2$ being received as a "1" instead of a "0," or a single bit error in the code group. If the transmitted data is highly correlated, this code group will bear a statistical relationship to code groups transmitted prior and subsequent thereto, in a manner which will conform to a particular conditional probability distribution as previously discussed. Upon reconstruction of the received code group 0100 1001 containing the error, the level or number assignment represented thereby is 233 which is obviously outside the standard deviation in the corresponding conditional distribution functon. Thus, the error may be detected immediately upon reception, rather than being mistaken as data.

A similar error occurring in transmission of the conventional binary code group assigned to number 73 would result in receipt of the code group 0000 1001. Again, the bit occurring in the second most significant position is in error. Upon reconstruction, the group would correspond to level or number 9 rather than 73. This also appears to be a signficant deviation from the conditional distribution function standard deviation. The reason for the apparent error detection capability in the conventional binary code group is that the disturbance occurred at a particular instant of time to change the state of a highly weighted element of the code group. As errors occurred in progressively smaller bit weights the error deviations from standard would become progressively less. In such cases detection of errors is appreciably more difficult because there is no accentuation. Even elaborate statistical analysis provides no guarantee of detection, especially where the error is slight. In this respect it is to be noted that even slight errors are often signficant in a relative sense.

Assume again, as an example, that the disturbance, and error, occurs in the fifth most signficant position of the transmitted 73 code group. In the contrast code group such an error results in reception of the group 0000 0001 corresponding to the contrast code level assignment 241. A similar transmission error in the conventional binary code group would result in the reception of the code group 0100 0001 which corresponds to the binary code level assignment 64. It will be readily observed that an error occurring in any element position of a contrast code group will result in a reconstructed assignment differing significantly from the original data assignment, whereas this is not generally true of the conventional binary code or of other known codes. In employing these latter codes, the errors are much more likely to be mistaken as data. For this reason, elaborate error detection apparatus, such as parity check devices, are generally employed in conjunction with the data transmission apparatus.

It will be observed that in the exemplary eight bit contrast code class illustrated in Table 1 the code is formed by employing every unique combination of the first four most signficant bits in the conventional binary code. This is a characteristic of the relationships indicated by Equations 1 to 4. The result is 16 possible combinations for the first four bits of the code group, each of these combinations then being uniquely combined with each of the 16 combinations of the last four bits to provide an entire 8 bit contrast code.

The seven bit contrast codes may be formulated by omitting the last bit, i.e. the least significant bit, of the 8 bit code groups and utilizing only the 128 code groups which are assigned to even decimal integers. The seven bti contrast code assignment would thus contain levels having half the value of those in the corresponding eight bit assignment, with eight code groups appearing in each subdivision. An entire class of seven bit contrast codes would be obtained by employing, as before, all possible permutations of the 16 subdivisions, and of the eight code groups within each subdivision, as well as all permutations of the seven columns of the seven bit contrast code derived from the illustrative eight bit code.

In a similar manner a six bit contrast code may be obtained by omitting the last two bits of an eight bit code and using only those code groups which are assigned to levels or numbers which are multiples of four. The new assignment would then be equal to one fourth the value of the eight bit code assignments, and would consist of 16 subdivisions, each containing four code groups. Again, every possible permutation of the 16 subdivisions, the four code groups within each subdivision, and the six columns would form a six bit class of contrast codes. In deriving these basic seven and six bit contrast codes in terms of the conventional binary code, the code group elements $b_8$ and $a_8$ in the seven bit case, and $b_7$, $b_8$, and $a_7$, $a_8$ in the six bit case, would be omitted from Equations 1 to 8. Any code class will, of course, contain $2^n$ code groups where $n$ is the number of bits in each group.

Referring now to the drawings, FIGURE 1 illustrates a typical information transmission system, for example a PCM system, utilizing contrast code conversion. Information carried by an input message signal or function is sampled in accordance with well known data sampling techniques by data sampler 10, after which the sampled data is applied to a quantizer 12 for establishing a discrete level corresponding to each sample. The number of discrete levels required wil obviously depend to a great extent on the information content of the signals to be transmitted, and will also take into account the signal and noise characteristics of the particular transmission medium employed. These levels are then suitably coded, in accordance with the information to be transmitted, by a contrast encoder 14, in the form of pulses or other signals, for transmission via channel 16 to the receiving point. Again, it will be understood that in this context "transmission" refers also to the storage of data for subsequent retrieval. The received coded signals are suitably decoded at 18 to conventional or straight binary code, after which the original data constituting the desired information may be reconstructed from output device 20. Such information transmission systems, except for employment of contrast coding, are well known per se.

Figure 2:
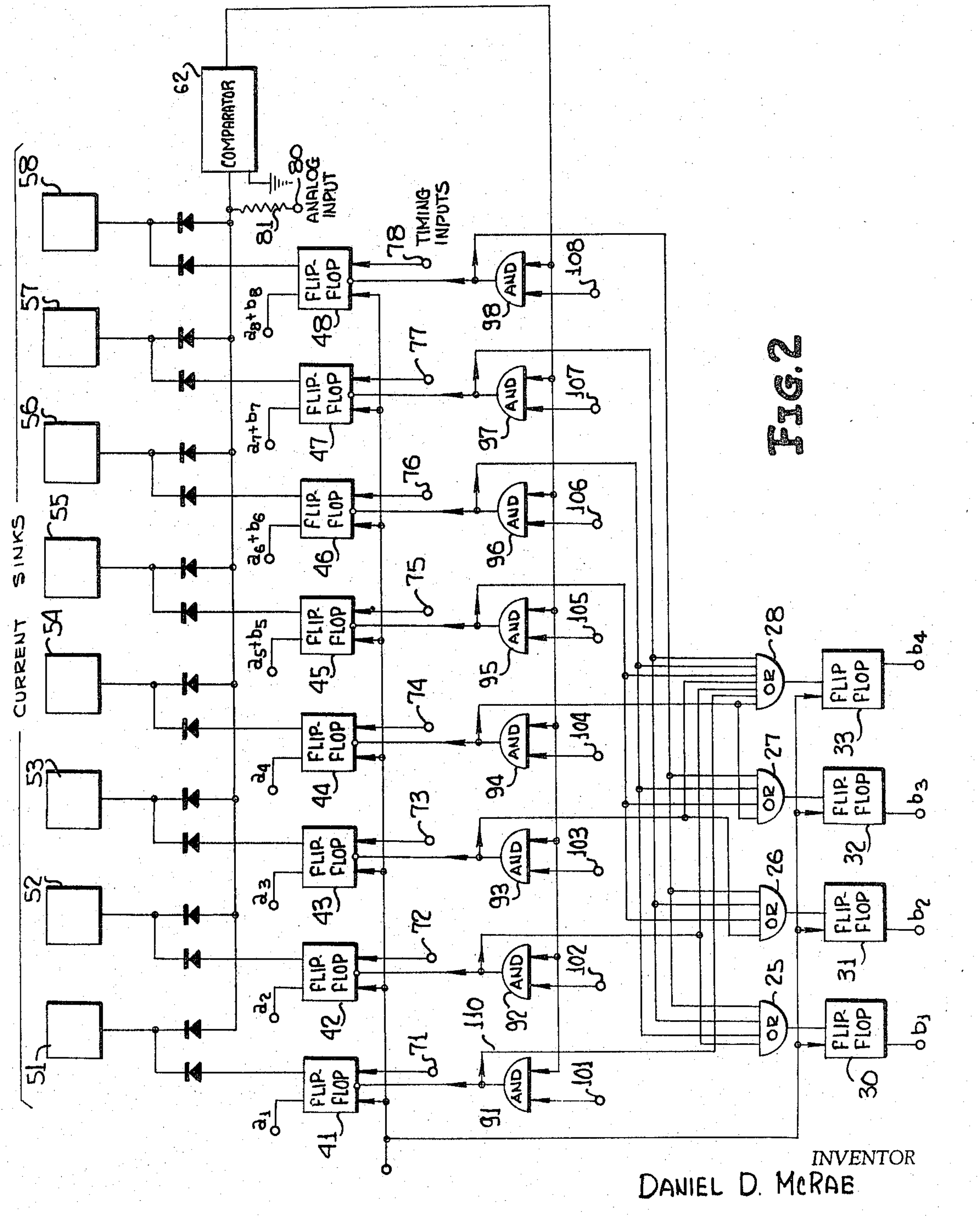
FIGURE 2 is an exemplary form of analog to contrast code converter.

FIGURE 2 is a block diagram of an exemplary form of analog to digital feedback-type encoder, which may be employed for conversion of an analog input to a contrast code. The structure and operation of this exemplary converter is similar to that of the standard half-split directed current binary coder, with the exception of OR gates 25 to 28 and flip-flops 30 to 33 and their respective couplings to the conventional coder. Briefly, the sequence of operation is as follows: Flip-flops 41 to 48 form a digital register, which is coupled to current sinks 51 to 58. The current sinks operate as a digital to analog converter, sink 51 permitting passage of half scale current and successive sinks permitting half the current flow of the next preceding sink. The register comprising flip-flops 41 to 48 is initially set to "0", for example, by means of a set input which precedes the coding operation and sets each flip-flop to the state at which a positive output is provided. The current sinks are thus shunted through the flip-flops to prevent current flow on the bus 60 to comparator 62. In addition, flip-flops 30, 31, and 32 are set such that the output of each is negative ("1") and flip-flop 33 is set to provide a positive output ("0"). Controlled timing inputs at points 71 to 78 sequentially change the states of the flip-flops from left to right in the figure, i.e. from 41 to 48. Each step in the sequence converts the resulting digital number to an analog parameter, in this case current, which is subsequently compared to the analogue input at 80.

As an example of operation, the timing input at 71 causes flip-flop 41 to change state, in this case from "0" to "1," the set input having placed each of flip-flops 41 to 48 in the "0" state. This change of state of flip-flop 41 removes the shunt from bus 60 to sink 51, permitting half scale current to flow along the bus through the resistance 81. If the analog input at 80 is above half scale, that is if the analog input is larger than the half scale current, the comparator will respond with a positive output ("0"), for example, and if below half scale, the comparator output will be negative. Timing input at 101 is "anded" with this comparator output at AND gate 91 and a change of state of flip-flop 41 is effected if the comparator output is positive; that is, if the analog input is greater than half scale. For a positive comparator output flip-flop 41 will have a positive output and will thus again shunt the half scale current sink 51, removing this current from bus 60. In addition, the positive comparator output will result in a change of state of flip-flop 33 through AND gate 91 output at line 110. If, however, the analog input is less than half scale the comparator output will be negative and flip-flop 41 will remain in its previously assumed state, permitting the half scale current to continue to flow.

Similar operation occurs with respect to the remaining current sinks 52 to 58 as timing pulses are sequentially supplied at points 72 to 78 and 102 to 108. Thus, for example, quarter scale current is applied through resistance 81 when timing pulses are applied at 72 and subsequently 102, in the aforementioned manner, and eight scale current when timing pulses occur at 73 and 103, and so forth. In this manner, the outputs $a_1$ through $a_8$ take on the proper states for the conventional binary code representing the analog input voltage. Following the entire coding operation, that is after timing pulses are applied at 78 and 108, the outputs $b_1$ through $b_8$ are related to the conventional binary outputs $a_1$ to $a_8$ in the manner indicated by relationships (1) to (8). The code thus produced represents an 8 bit contrast code assignment for the analog input. When the conversion operation is completed, the contrast code representation of the analogue input voltage is stored in the register comprising flip-flops 30 to 33 ($b_1$ to $b_4$) and 45 to 48 ($b_5$ to $b_8$) for direct transmittal or for storage in appropriate conventional memory units for subsequent retrieval. It will be understood that other means of conversion from analog to contrast code may also be provided by similar modification of conventional existing equipment, the embodiment shown and described in FIGURE 2 being purely exemplary.

Figure 3:
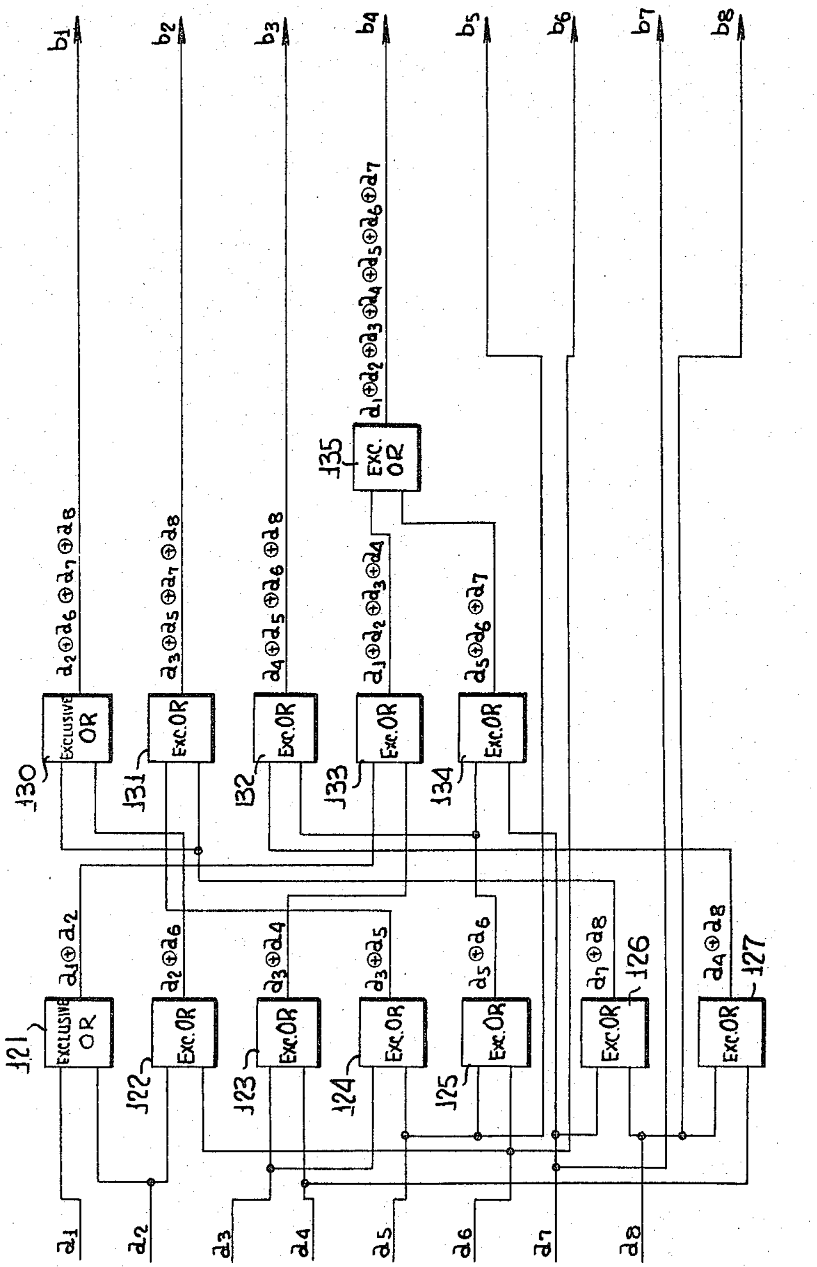
FIGURE 3 is an exemplary form of binary to contrast code converter.

FIGURE 3 is a block diagram of one embodiment of a binary-to-contrast code converter, wherein a parallel binary code is converted to a parallel contrast code. The term "parallel" is used in its usual sense to indicate that the code may be obtained from a register or the like where it has been previously stored or converted. A first plurality of half adder or exclusive OR circuits 121 to 127 are employed to perform modulo-2 addition of appropriate pairs of the conventional binary code group bits. The outputs as illustrated are then applied to a second plurality of circuits 130 to 134 in a manner appropriate to perform the modulo-2 addition of the desired element for production of outputs $b_1$ to $b_3$. Output $b_4$ is obtained from half adder 135, which combines the outputs of the last half adders 134, 134 as shown. Bits $b_5$ to $b_8$ are again obtained by simply reproducing the corresponding elements $a_5$ through $a_8$ of the conventional binary code group. Here again, it is to be emphasized that the binary to contrast code converter illustrated in FIGURE 3 and herein described is purely exemplary, and provides but one of numerous methods of performing the desired conversion.

Contrast code conversion and the use of such a code in a highly correlated digital transmission system provides an advantageous method of rapidly and readily distinguishing between received data and errors in such data by automatically accentuating the errors. It is to be noted that either the analog-to-contrast code converter or the binary-to-contrast code converter may be employed in systems such as that shown in FIGURE 1 with appropriate decoding equipment utilized at the receiving point. Decoding may be effected by modification of existing equipment in a manner analogous to the modification described for providing the coding circuitry.

It will be understood that while certain embodiments have been shown and described, various modifications and changes are possible without departing from the true spirit and scope of the invention. It is therefore desired that the present invention be limited only by the appended claim.

In the claims, terminology such as "signal groups," "pulse groups," "signal positions," "sequence of signals," and similar phrases, will be understood to include the presence or absence of signal or a combination thereof.

1. Apparatus for providing error-accentuating code signals from conventional binary coded signals, each of said conventional binary coded signals being a group of pulses having a positional sequence corresponding to a discrete level in a numerically weighted succession of parameter levels, said apparatus comprising means for translating each of said conventional binary coded signals to a further binary coded signal corresponding to the same discrete level and having the same number of bits as the binary coded signal from which it is derived, said translating means including circuit means for performing functional logic operation on preselected pulses in the pulse sequence of each conventional binary coded signal to generate further pulses, and means for arranging said further pulses and a predetermined number of pulses in the pulse sequence in groups to form said further binary coded signals, the sequence of pulses in each of said further binary coded signals differing in at least half the pulse positions from pulse sequences in each of the other of said further signals in a predetermined succession of said discrete levels of which said further signals are representative.

2. A code converter comprising circuit logic means for combining signals applied thereto in a predetermined functional manner, means for applying binary coded signal groups of $n$-signals each to said circuit logic means, said logic means having outputs for positioning said functionally combined signals in contrast coded signal groups of $n$-signals each, each group being representative of a discrete data level wherein preselected successions of said levels are represented by contrast coded signal groups each differing from the others in said successions in at least half the signal positions thereof.

3. The combination according to claim 2 wherein said circuit logic means performs modulo-2 addition of preselected signal sequences in semi-groups of said binary coded signal groups to produce said functionally combined signals.

4. The combination according to claim 3 wherein said binary coded signals groups each contain eight signals in the sequence $a_1$, $a_2$, $a_3$, $a_4$, $a_5$, $a_6$, $a_7$ and $a_8$, where "$a$" represents either of two permissible conditions of an electrical circuit and the $a$-subscripts represent both the sequential order of signals and the inverse order of digit significance in said binary coded signal groups, and wherein said contrast coded signals are related to said binary coded signals in accordance with $b_1=a_2\oplus a_6\oplus a_7\oplus a_8$, $$b_2=a_3\oplus a_5\oplus a_7\oplus a_8,\ b_3=a_4\oplus a_5\oplus a_6\oplus a_8,$$
$$b_4=a_1\oplus a_2\oplus a_3\oplus a_4\oplus a_5\oplus a_6\oplus a_7,$$
$$b_5=a_5,\ b_6=a_6,\ b_7=a_7,\ b_8=a_8$$

where $b$ corresponds to either of two permissible conditions of an electrical circuit and $b$— subscripts 1 to 8 represent the sequential order of signals in said contrast coded signal groups.

5. In a digital data transmission system, means for converting conventional binary coded signal groups to respective further binary coded signal groups wherein each of said last-named signal groups consists of the same number of signals as its respective counterpart conventional binary coded signal group, said converting means including functional logic circuit means for deriving signals for said further coded signal groups from preselected combinations of signals of said conventional binary coded signal groups, said converting means having output means for sequentially positioning said derived signals in said further binary coded signal groups to provide at least part of said last-named signal groups with signal sequences differing in at least half the signal positions from the signal sequences in related further binary coded signal groups, said related groups corresponding to a group of successive discrete levels providing informational content of a message signal.

6. The combination according to claim 5 wherein said signal groups contain $n$ signals, said logic circuit means deriving $m$ of said $n$ signals for said further binary coded signal groups, where $m$ is an integer less than $n$, said converting means including means for direct passage of $n-m$ of said conventional binary coded signals for supplying the remaining signals for said further binary coded signal groups.

7. The combination according to claim 6 wherein said converting means provides said further binary coded signal groups in accordance with the sampling of said discrete message signal levels, each separate sequence of signals in said further signal groups being uniquely correlated with a separate discrete level, said related signal groups being representative of $p$ successive levels in the total number of levels defining said informational content, where $p$ is an integer equal to $2^n/16$.

8. The combination according to claim 6 wherein said logic circuit means derives said $m$ signals of said further signal groups by modulo-2 addition of preselected sequences of said binary coded signals.

9. In a code signal communication system for transmitting digital data representing the information carried by a message signal, means for sampling said signal to obtain data therefrom, means for quantizing said sampled data in a plurality of discrete digital levels, means for encoding said levels into contrast coded signal groups having multiple signals positioned in sequences representative of said levels, each succeeding level having a contrast code signal group sequence uniquely correlated therewith, the maximum number of signal positions for any of said signal groups being equal to the number of bits required to represent all of said digital levels in a conventional pure binary code, said contrast code signal groups being related in sequences of successive levels wherein each of said level sequences contains digital levels represented by contrast code signal groups differing in at least half of said signal positions from each of the other contrast code signal groups representative thereof, a receiving station, means for transmitting said contrast code signal groups derived from said sampled data to said receiving station, and means at said receiving station for decoding said contrast code signal groups for reconstruction of said message signal.

10. The combination according to claim 9 wherein said means for quantizing comprises: a plurality of reference signal sources, each reference signal having a different signal level; and means for sequentially comparing each reference signal to said sampled data for providing a respective comparison output pulse for each comparison in which the sampled data signal exceeds a reference signal level.

11. The combination according to claim 10 wherein said means for encoding comprises: a plurality of two input AND gates, one for each of said reference signal sources; means for applying said comparison output pulses to one input of each AND gate; means for sequentially applying a timing pulse to the second inputs of said AND gates, each AND gate receiving said timing pulse in synchronism with the comparison of that gate's associated reference signal and said sample to data signal, wherein each AND gate provides an output signal in response to time coincidence of its timing signal and said comparison pulse; and memory logic means responsive to said AND gate output signals for arranging said signals in accordance with said contrast code and for storing said signals until all of said reference signals have been compared with said sampled data signal.

12. Apparatus for providing error-accentuating binary coded signals from analog information signals comprising: means for sampling said analog information signals; means for quantizing said sampled data in a plurality of discrete digital levels; and means for encoding said levels into contrast coded binary signals each having only as many bits as required to uniquely represent all of said discrete levels, wherein each contrast code signal has a digital level uniquely corresponding therewith, said contrast code signals being arranged in groups corresponding to successive digital levels, any signal in a group differing from any other signal in that group in at least half of its assigned bit locations.

13. A code converter comprising circuit logic means for combining signals applied thereto in a predetermined functional manner, means for applying binary coded signal groups to said circuit logic means, said logic means having outputs for positioning said functionally combined signals in contrast coded signal groups representative of discrete data levels wherein preselected successions of said levels are represented by contrast coded signal groups each differing from the others in said successions in at least half the signal positions thereof, wherein said binary coded signal groups each contain an equal number of signals in the sequence $a_1, a_3 \ldots a_n$ where $a$ represents either of two permissible conditions of an electrical circuit and $n$ is the last signal in the sequence representing the least significant digit of the binary code, wherein said logic circuit means performs modulo-two addition of preselected signal sequences in semi-groups of said binary coded signal groups to produce said functionally combined signals, wherein said contrast coded signal groups contain a like number of signals to that contained in said binary coded signal group, wherein said signal groups contain eight signals and wherein said contrast coded signals are related to said binary coded signals in accordance with $$b_1=a_2\oplus a_6\oplus a_7\oplus a_8;\ b_2=a_3\oplus a_5\oplus a_7\oplus a_8;$$
$$b_3=a_4\oplus a_5\oplus a_6\oplus a_8;\ b_4=a_1\oplus a_2\oplus a_3\oplus a_4\oplus a_5\oplus a_6\oplus a_7;$$
$$b_5=a_5;\ b_6=a_6;\ b_7=a_7;\ b_8=a_8$$

where $b$ corresponds to either of two permissible conditions of an electrical circuit and $b$-subscripts 1 to 8 represent the sequential order of signals in said contrast coded signal groups.

14. In a digital data transmission system, means for converting conventional binary coded signal groups to further binary coded signal groups, said converting means including functional logic circuit means for deriving signals for said further coded signal groups from preselected combinations of signals of said conventional binary coded signal groups, said converting means having output means for sequentially positioning said derived signals in said further binary coded signal groups to provide said last-named signal groups with signal sequences differing in at least half the signal positions from the signal sequences in related further binary coded signal groups, said related groups corresponding to a group of successive discrete levels providing informational content of a message signal, wherein said signal groups contain $n$ signals, said logic circuit means deriving $m$ of said $n$ signals for further binary coded signal groups, where $m$ is an integer less than $n$, said converting means including means for direct passage of $n$-$m$ of said conventional binary coded signals for supplying the remaining signals for said further binary coded signal groups.

15. The combination according to claim 14 wherein said converting means provides said further binary coded signal groups in accordance with the sampling of said discrete message signal levels, each separate sequence of signals in said further signal groups being uniquely correlated with a separate discrete level, said related signal groups being representative of $p$ successive levels in the total number of levels defining said informational content, where $p$ is an integer equal to $2^n/16$.

16. The combination according to claim 14 wherein said logic circuit means derives said $m$ signals for said further signal groups by modulo-two addition of preselected sequences of said binary coded signals.

References Cited

UNITED STATES PATENTS 3,030,614 4/1962 Lehan et al. ---------- 340—204

OTHER REFERENCES

Green, J. H., and San Soucie, R. L., An Error-Correcting Encoder and Decoder of High Efficiency, Proceedings of the IRE, October 1958, pp. 1471–1474.

MALCOLM A. MORRISON, *Primary Examiner.*

C. E. ATKINSON, *Assistant Examiner.*